United States Patent
Saglam et al.

(10) Patent No.: US 7,277,703 B2
(45) Date of Patent: Oct. 2, 2007

(54) APPARATUS, AND AN ASSOCIATED METHOD, FOR FACILITATING NETWORK SELECTION UTILIZING MODIFIED SCAN LIST

(75) Inventors: Akif Saglam, San Diego, CA (US); Tao He, San Diego, CA (US)

(73) Assignee: Nokia Corporation, Espoo (FI)

( * ) Notice: Subject to any disclaimer, the term of this patent is extended or adjusted under 35 U.S.C. 154(b) by 87 days.

(21) Appl. No.: 10/881,743

(22) Filed: Jun. 30, 2004

(65) Prior Publication Data

US 2006/0003764 A1   Jan. 5, 2006

(51) Int. Cl.
*H04Q 7/20* (2006.01)
*H04M 1/00* (2006.01)
(52) U.S. Cl. ............... 455/434; 455/432.1; 455/435.2; 455/450; 455/422.1; 455/550.1; 455/556.2
(58) Field of Classification Search .. 455/456.1–456.3, 455/456.6, 418–420, 161.1, 433–434, 435.2, 455/435.3, 436–440, 452.2, 466, 62, 515–517, 455/432.1–432.3, 67.11, 550.1, 574, 455, 455/115.3, 127.1, 127.5, 150.1, 403, 422.1, 455/446–451, 452.1, 464, 509, 524–525, 455/556.2, 560–561, 154.1–154.2, 158.1, 455/161.3, 166.1, 166.2; 370/310–312, 314, 370/328–329, 330–33, 347–350, 338, 341, 370/431, 433, 437, 450, 458–459

See application file for complete search history.

(56) References Cited

U.S. PATENT DOCUMENTS

| | | | | |
|---|---|---|---|---|
| 5,799,259 A | * | 8/1998 | Rief et al. | 701/41 |
| 5,953,320 A | * | 9/1999 | Williamson et al. | 370/252 |
| 6,144,653 A | * | 11/2000 | Persson et al. | 370/337 |
| 6,173,181 B1 | * | 1/2001 | Losh | 455/434 |
| 6,185,423 B1 | * | 2/2001 | Brown et al. | 455/434 |
| 6,807,163 B1 | * | 10/2004 | Shi | 370/337 |
| 6,822,973 B2 | * | 11/2004 | Kelley et al. | 370/503 |
| 2003/0193910 A1 | | 10/2003 | Shoaib et al. | |
| 2004/0063427 A1 | * | 4/2004 | Narasimha et al. | 455/434 |
| 2004/0192306 A1 | * | 9/2004 | Elkarat et al. | 455/435.2 |
| 2004/0205158 A1 | * | 10/2004 | Hsu | 709/218 |
| 2004/0224716 A1 | * | 11/2004 | Choi | 455/522 |
| 2005/0063334 A1 | * | 3/2005 | Fnu et al. | 370/329 |
| 2005/0164741 A1 | * | 7/2005 | Rajkotia et al. | 455/561 |
| 2006/0009216 A1 | * | 1/2006 | Welnick et al. | 455/434 |

FOREIGN PATENT DOCUMENTS

| | | |
|---|---|---|
| EP | 1531645 A1 | 5/2005 |
| WO | WO 2004/040931 A2 | 5/2004 |
| WO | WO 2004/040931 A3 | 5/2004 |

* cited by examiner

*Primary Examiner*—Meless Zewd
(74) *Attorney, Agent, or Firm*—Alston & Bird LLP

(57) ABSTRACT

Apparatus, and an associated method, for facilitating selection of a target radio network through which a mobile node operable in a radio communication system shall subsequently communicate. A modified scan list is formed based upon a formal scan list. The modified scan list is of a reduced number of a reduced size relative to the formal scan list, thereby permitting subsequent selection, made from the modified scan list, by a selector of a target radio network to be made in a reduced amount of time.

23 Claims, 3 Drawing Sheets

APPARATUS, AND AN ASSOCIATED METHOD, FOR FACILITATING NETWORK SELECTION UTILIZING MODIFIED SCAN LIST

The present invention relates generally to a manner by which to select, at a mobile node, a network of a multiple-network radio communication system through which to communicate. More particularly, the present invention relates to apparatus, and an associated method, by which to create a modified scan list identifying potential target radio networks based upon a formal scan list, and to select a potential target radio network from the modified scan list.

Determination of which radio networks of the formal scan list shall also form part of the modified scan list is made responsive to signal detections made during portions of powered intervals when the mobile node is operated in a slotted mode. The determinations form a priori knowledge that permits creation of the modified scan list. And, use of which, in turn, permits more efficient selection of the target radio network when selection is needed to be made.

BACKGROUND OF THE INVENTION

A communication system provides for the communication of data between communication stations of a set of communication stations. The set of communication stations includes at least one communication station that forms a sending station and another communication station that forms a receiving station. The sending and receiving stations of the set of communication stations are interconnected by way of a communication channel upon which the sending station sends the data that is to be communicated to a receiving station. And, a receiving station receives the data by detecting its communication upon the communication channel.

Many different types of communication systems have been developed and deployed to permit the effectuation of various types of communication services through the communication of data in such communication systems. Communications systems that provide either of point-to-point communication services and point-to-multi-point communication services are regularly utilized by both providers and consumers of data. With continued advancements in communication technologies, additional types of communication systems, permitting additional types of communication services to be effectuated therethrough, shall likely be developed and deployed.

A radio communication system is an exemplary type of communication system. Both point-to-point and point-to-multi-point communication systems are implementable as radio communication systems. A radio communication system utilizes radio channels upon which to communicate data between communication stations to effectuate a communication service therebetween. Wireline communication systems, in contrast, define communication channels upon wirelines that interconnect the sending and receiving stations. Because a wireline communication system requires that the communication stations be interconnected by way of a wireline, the communication stations of a wireline communication system must be positioned at locations that permit such wireline connections to be formed. As a radio communication system does not require a wireline to interconnect the communication stations, the communication stations of a radio communication system are positionable at locations at which wireline connections cannot be, or would only inconveniently be, formed. Additionally, a radio communication system is amenable for implementation as a mobile communication system in which one or more of the communication stations between which data is communicated is permitted mobility.

A cellular communication system is a type of radio communication system. Communication services involving the communication of both voice and data are typically effectuable by way of a cellular communication system. The networks of various cellular communication systems have been installed to encompass, collectively, significant portions of the populated areas of the world.

A network that is installed over a selected geographic area is typically formed of a plurality of spaced-apart base transceiver stations, each of which defines a coverage area, referred to as a cell. The coverage area is defined by the plurality of base transceiver stations of the network. The coverage areas of the base transceiver stations of the network together define the coverage area of the network formed therefrom. A network is operated by a network operator. And, different networks are operated by different network operators.

Communications are effectuated in a cellular communication system typically through the use of a mobile station, a radio transceiver. The mobile station is operated by a user. Communications are effectuated between the mobile station and a base transceiver station of the network, generally the base transceiver station in whose coverage area that the mobile station is positioned. Access to communicate with the network of the communication system is sometimes provided by way of a service subscription, or other purchase of access to communicate by way of the network part of the communication system.

Different networks, e.g., networks installed to encompass separate geographical areas, are sometimes operated by different network operators. Additionally, networks are sometimes installed to encompass, partially, or fully, overlapping geographical areas. A mobile station, associated with a particular network by its subscription to service therein, might be later operated at a location that is encompassed by a network other than its home network. To permit operation of the mobile station when the mobile station is positioned at the location beyond the coverage area of its home network, the mobile station must become associated with another network to permit communications therethrough. When the mobile station roams beyond its home network, and the location at which the mobile station becomes positioned is encompassed by more than one network, a decision must be made of with which of the networks that the mobile station shall become associated.

The operating specifications by which the mobile stations and networks of a cellular radio communication systems are operable define procedures by which a roaming mobile station shall become associated with another network and also define manners by which selection is made of the network through which the mobile station shall communicate. For instance, a cdma2000 operating specification defines such procedures. Amongst such procedures is the use of a formal scan list that is provided to, or otherwise maintained at, the mobile station. The formal scan list contains the listings of identities, at least identified in terms of communication channel identities, of networks that might be available for use by the mobile station to communicate therethrough. The identities listed on the formal scan list are also sometimes identified in terms of a preferred roaming list that identifies, in order of preference, networks with which the mobile station is to communicate when the mobile station roams beyond its home network or is otherwise unable to communicate by way of its home network.

Procedures are set forth, such as better system rescan procedures, to select a network with which to communicate when the mobile station is communicating with a less than most-preferred network. Conventionally, the mobile station searches for every network identified on the formal scan list to determine whether a more-preferred network is available through which to communicate. This conventional procedure, however, is potentially time-consuming as the formal scan list might contain a large number of networks, some of which are not available.

Additionally, procedures are set forth for the mobile station to search for a network through which to communicate when the mobile station is communicating with a most-preferred network, but communications with the most-preferred network fail, or are considered likely to fail. Also, here, the formal scan list is conventionally utilized to search for another network through which to communicate. Again, however, use of the formal scan list might contain a large number of networks, some of which are unavailable. Searching for the availability of each of the networks contained on the formal scan list might again be a time-consuming process.

An improved manner that facilitates network selection by a mobile station of with which network that the mobile station shall communicate would therefore be advantageous.

It is in light of this background information related to communications in a cellular, or other radio, communication system that the significant improvements of the present invention have evolved.

SUMMARY OF THE INVENTION

The present invention, accordingly, advantageously provides apparatus, and an associated method, by which to select, at a mobile node, a network of a multiple-network radio communication system through which to communicate.

Through operation of an embodiment of the present invention, a manner is provided by which to create a modified scan list. The modified scan list identifies potential target radio networks based upon a formal scan list. And a manner is provided to select a potential target radio network from the modified scan list.

Determinations are made at the mobile node of which of the radio networks that are listed on the formal scan list are to be listed on the modified scan list. Such determinations are made responsive to signal detections of signals broadcast by the radio networks listed on the formal scan list. The detections are made during portions of powered intervals in which the mobile node is powered when the mobile node is operated in a slotted mode of operation. The detections are made, for instance, prior to a need to select a network through which to communicate. That is to say, the detections form a priori knowledge of the networks that might be available through which to communicate. And, also, networks that are determined not to be available are excluded from availability in the modified scan list. When the modified scan list is subsequently utilized to select the network through which the mobile node shall communicate, already-determined unavailable networks are excluded from the selection process. As the modified scan list is formed of a reduced number of networks relative to the number of networks listed in the formal scan list, the use of the modified scan list rather than the formal scan list by which to select a network with which to communicate permits such selection to be made in a lessened amount of time relative to use of the formal scan list. As selection is made more quickly, communications, such as ongoing communications by the mobile node, are enhanced. Lessened likelihood of service interruption or service degradation or service at reduced quality levels results.

In one aspect of the present invention, the mobile node maintains a preferred roaming list that indicates the identities of preferred networks, in order of preference, through which the mobile node is to communicate when the mobile node roams beyond its home network or the home network is otherwise unavailable for use through which to communicate. The preferred roaming list forms a formal scan list or the formal scan list is directly derived therefrom. The formal scan list is utilized from which to obtain a modified scan list. The modified scan list is subsequently used when selection is to be made to select a network through which the mobile node shall subsequently communicate.

The modified scan list is utilized, for instance, pursuant to better system rescan operations. Formation of the modified scan list is performed during normal operation of the mobile node. And, the modified scan list is subsequently accessed to select a network through which to communicate when better system rescan operations are performed.

The modified scan list is also utilized in a system-lost scenario. That is to say, when a preferred network is utilized through which to communicate but the communications with the preferred network are lost or significantly degraded, the modified scan list is accessed and used by which to select a network through which to carry out subsequent communications.

In another aspect of the present invention, the modified scan list is created as a result of detections made when the mobile node is operated in a slotted mode. In a slotted mode, the mobile node is powered for brief periods and in a sleep mode during other periods. The periods during which the mobile node is powered and the periods during which the mobile node is in a sleep mode is dependent upon a slot cycle index pursuant to which the mobile node operates. The mobile node is powered conventionally during the powered periods so that the mobile node is able to detect page messages broadcast thereto. Pursuant to operation of an embodiment of the present invention, the duration of the powered periods when the mobile node is operated in the slotted mode are increased. And, during the portion of the powered period that has been increased, the mobile node operates to form the modified scan list. The modified scan list is formed of networks that are determined, through detection of signals broadcast by the networks, that the networks are available, and hence are candidates to be selected as the networks through which the mobile node shall subsequently communicate. Because the detection, corresponding determination, and populating of the modified scan list occurs prior to the need to make selection, the detections form a priori knowledge that is subsequently usable when selection of a network is required.

The subsequent selection of a network is more quickly carried out as networks that are known to be unavailable are not considered as possible candidates for the communications. Improved speed of selection and improved communications as a result thereof, are provided.

In these and other aspects, therefore, apparatus, and an associated method, is provided for a radio communication system. The radio communication system has a mobile node that is selectably operable to communicate by way of an active radio network and subsequently selectably operable to communicate by way of a selected target radio network. The selected target radio network is identified in a formal scan list that lists a first set of potential target radio networks. Selection of the selected target radio network is facilitated. A signal detector is adapted to receive indications of the potential target radio networks that are listed in the formal scan list. The signal detector detects, during selected time intervals, signals communicated by the potential target radio networks. A modified scan list creator is adapted to receive indications of the potential target radio networks, if any, whose signals are detected by the signal detector. The modified scan list creator creates a modified scan list that identifies the potential target radio network associated with the signals detected by the signal detector. The potential target radio networks identified in the modified scan list are a subset of the first set of potential target radio networks. A selector is adapted to receive indications of the potential target radio networks of the modified scan list. The selector selects the selected target radio network therefrom according to a selection scheme.

A more complete appreciation of the present invention and the scope thereof can be obtained from the accompanying drawings that are briefly summarized below, the following detailed description of the presently-preferred embodiments of the present invention, and the appended claims.

DETAILED DESCRIPTION

Figure 1:
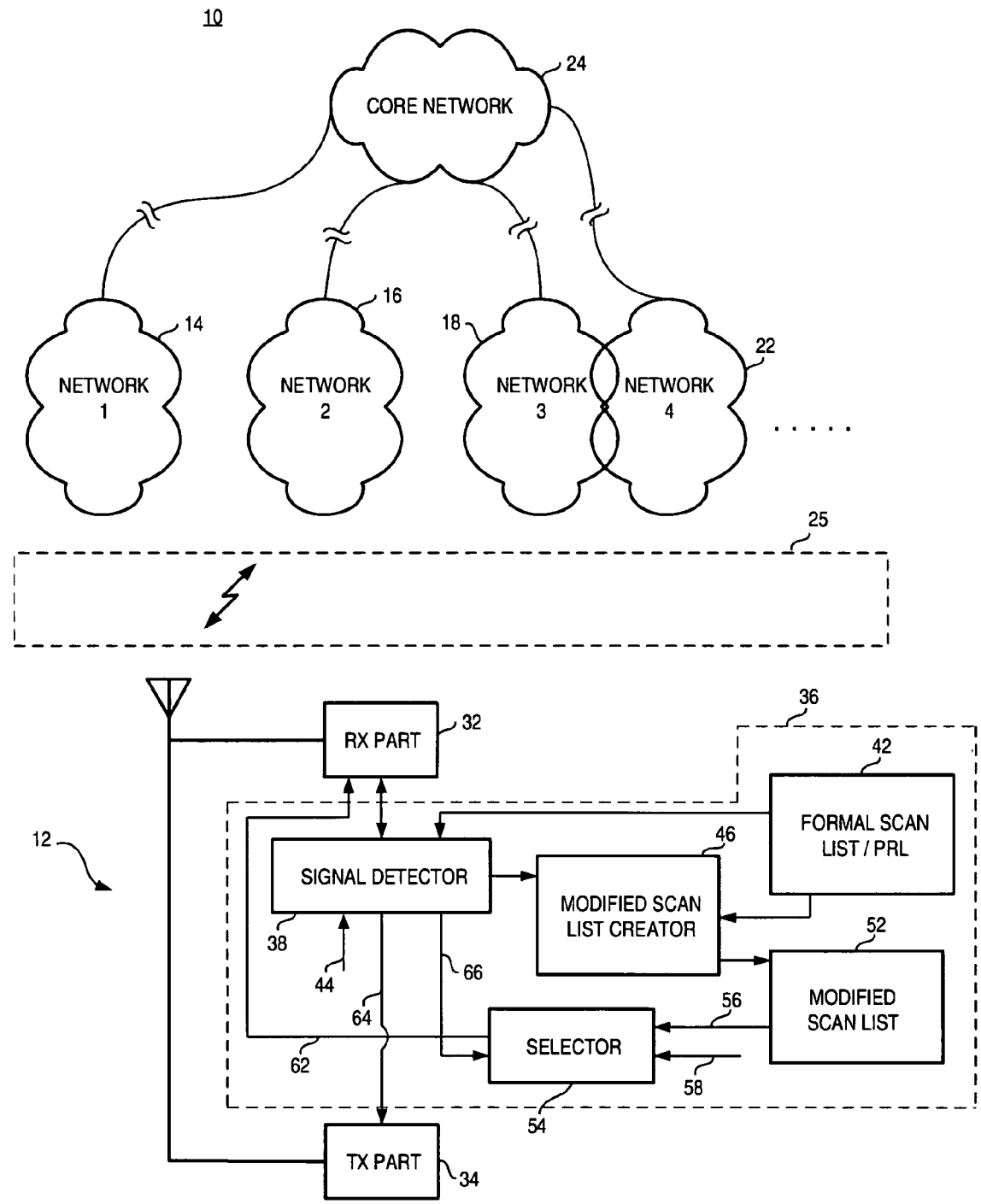
FIG. 1 illustrates a functional block diagram of a radio communication system in which an embodiment of the present invention is operable.

Referring first to FIG. 1, a radio communication system, shown generally at provides for the communication of data, such as pursuant to effectuation of a communication service, with mobile nodes, of which the mobile node 12 is representative. The radio communication system here forms a cellular communication system, formed of separate networks, here operable generally pursuant to the operating protocols of the cdma2000 operating specification. The radio communication system is analogously also representative of other types of radio communication systems. Accordingly, while the following description describes exemplary operation of the radio communication system in which the network portions thereof operate pursuant to the cdma2000 operating specification, operation of the radio communication system, implemented in other manners, can analogously be described.

The network part of the communication system is here formed of a plurality of network portions, a first network portion 14, a second network portion 16, a third network portion 18, and a fourth network portion 22. Additional network portions can analogously be represented. Each of the network portions defines a coverage area formed, e.g., of the collective coverage areas of cells of a plurality of base transceiver stations of the respective network portions. The network portions 14-22 here are each operable pursuant to a cdma2000 operating specification. Other network portions, operable pursuant to other operating standards, can also be represented. The separate network portions are coupled to a network core 24, or other appropriate communication fabric to provide for selected communication connectivity therebetween.

The network portions 14 and 16 define separate coverage areas while the coverage areas of the network portions 18 and 22 overlap one another.

The mobile station also operates pursuant to the operating protocols of the cdma2000 operating system, and the mobile node is capable of communicating with any of the network portions 14, 16, 18, and 22 within whose coverage area or areas that the mobile node is positioned. Data is communicated upon radio channels defined upon a radio air interface, represented by the block 25, shown in dash, between the mobile node 12 and the network of the radio communication system. Signaling protocols, including control channel signaling protocols are defined in the cdma2000 operating specification. When the communication system, or network portions thereof, are constructed pursuant to other operating specifications, the signaling protocols of such other operating specifications are utilized.

When a network-originated communication service is to be effectuated with the mobile node, a page message is broadcast to the mobile node to alert the mobile node of the pending communication service. The mobile node, upon detection of the page message, performs various communication-service related procedures, and the communication service is effectuated. Data communicated to the mobile node is communicated upon forward link channels, and data communicated by the mobile node is communicated upon reverse-link channels defined upon the radio air interface.

A network portion of the network communication system forms a home network associated with the mobile node. The home network is typically a network that defines a coverage area that encompasses locations at which the mobile node is most regularly positioned and used. In conventional manner, when the mobile node is moved between cells of the home network, conventional handoff procedures are carried out, as appropriate, to permit communication, or continue communication, between the network portion and the mobile node. When the mobile node is moved beyond the coverage area of its home network, the home network is not available through which to communicate. Additionally, even when positioned within the coverage area of its home network, the mobile node might be unable to communicate by way of its home network. In such situations, the mobile node might be able to communicate by way of another network portion, other than its home network.

A preferred roaming list (PRL) is usually provided to, or otherwise maintained at, the mobile node. The preferred roaming list lists alternate networks with which the mobile node is permitted to communicate, if such alternate networks are available. The preferred roaming list identifies the network portions by, for instance, the channels upon which control signaling is broadcast by such networks. The mobile node is able to determine the availability of such networks by tuning to the channels upon which the control signaling is broadcast. The preferred roaming list also, for instance, identifies, in order of preference, the networks identified therein. As noted previously, a preferred roaming list or formal scan list might contain a lengthy listing of networks. When the mobile node is to communicate with a network other than its home network, a lengthy period might be required by which to search for all of the available networks listed on such list to determine their availability and to select an available network through which to communicate.

The mobile node includes radio transceiver circuitry, here represented by a receive (RX) part 32 and a transmit (TX) part 34. The mobile node further includes apparatus 36 of an embodiment of the present invention. The apparatus is functionally represented, formed of functional entities that are implementable in any desired manner, such as by algorithms executable by processing circuitry. The apparatus 36 operates to facilitate selection of a network through which the mobile node shall communicate. Operation of the apparatus facilitates the selection by obtaining a priori knowledge of the availability of networks listed on a formal scan list. The a priori knowledge is utilized to reduce the number of networks whose control signals are attempted to be detected when the decision is made that the mobile node shall need to communicate, such as when the mobile node roams beyond its home network, when the mobile node is communicating by way of a network other than a most-preferred network, or when communications with a most-preferred network cannot be continued.

The apparatus includes a signal detector 38 that selectably operates to detect signals broadcast by networks listed on a formal scan list 42. The formal scan list is derived from or formed of a preferred roaming list. The signal detector is operable during selected time periods to tune to channels associated with the networks identified on the formal scan list and detect whether signals of at least selected signal values are broadcast thereon. The selected intervals during which the signal detector operates are controlled by signals generated on the lines 44. The signals generated on the lines 44, in one implementation, provide operative power to the signal detector during such time intervals during which the signal detector is to be operable. Control over when the signal detector is operable is, alternately, provided by other manners, such as by timed control of its operation.

Signals broadcast by individual network portions and detected by the signal detector during its periods of operation are provided to a modified scan list creator 46, here by way of the containing a listing of each network whose broadcast signal is detected by the signal detector, at least within a selected historical window.

The apparatus further includes a selector 54. The selector is selectably operable to access the modified scan list 52, here by way of the line 56. The selector selects a target network with which the mobile node shall attempt to communicate upon the occurrence of selected conditions, the indications of which are provided to the selector by way of the lines 58. The modified scan list forms a subset of the formal scan list and excludes identities of networks that, based upon operation of the signal detector, are unavailable. The modified scan list, therefore, lists potential target radio networks through which the mobile node can communicate. The selector selects the selected target radio network when selection is to be made, and indications of the selected target network are provided, here by way of the line 62, to the receive part 32. And, the receive part tunes to the appropriate channel and the signal detector detects the availability of the selected target radio network. If the network is available, indications are provided, here by way of the line 64, to the transmit part. If the network is not available, an indication is provided to the selector by way of the line 66, and the selector selects another potential target radio network. The operation of the selector and signal detector continues until an available radio network is located. In one implementation, the selector operates in its selection of the selected target radio network by taking into account the priority of the network indicated on the preferred roaming list. Because the modified scan list is created making use of information obtained through operation of the signal detector before selection is subsequently required to be made by the selector, the information obtained by the signal detector forms a priori knowledge to permit the modified scan list to be of a shortened length relative to the formal scan list. Because the modified scan list is of the shortened length, lessened numbers of networks need to be analyzed by the selector to select with which network that the mobile node shall communicate when selection is required.

The indication on the line 58 (?) is, for instance, generated pursuant to better system rescan operations. Better system rescan operations are performed when the mobile node is in communication connectivity with a network portion, but the network portion with which the mobile node is in the communication connectivity is a less than most-preferred network. Additionally, indications are provided to the selector when the mobile node is in communication connectivity with a most-preferred network, but the access to the network is interrupted, evidenced, for instance, by loss of a DPCH (Digital Paging Channel) signal. Upon occurrence of either the need to perform a better system rescan procedure or to select a network upon loss of a DPCH, the selector selects a target radio network from the modified scan list.

Figure 2:
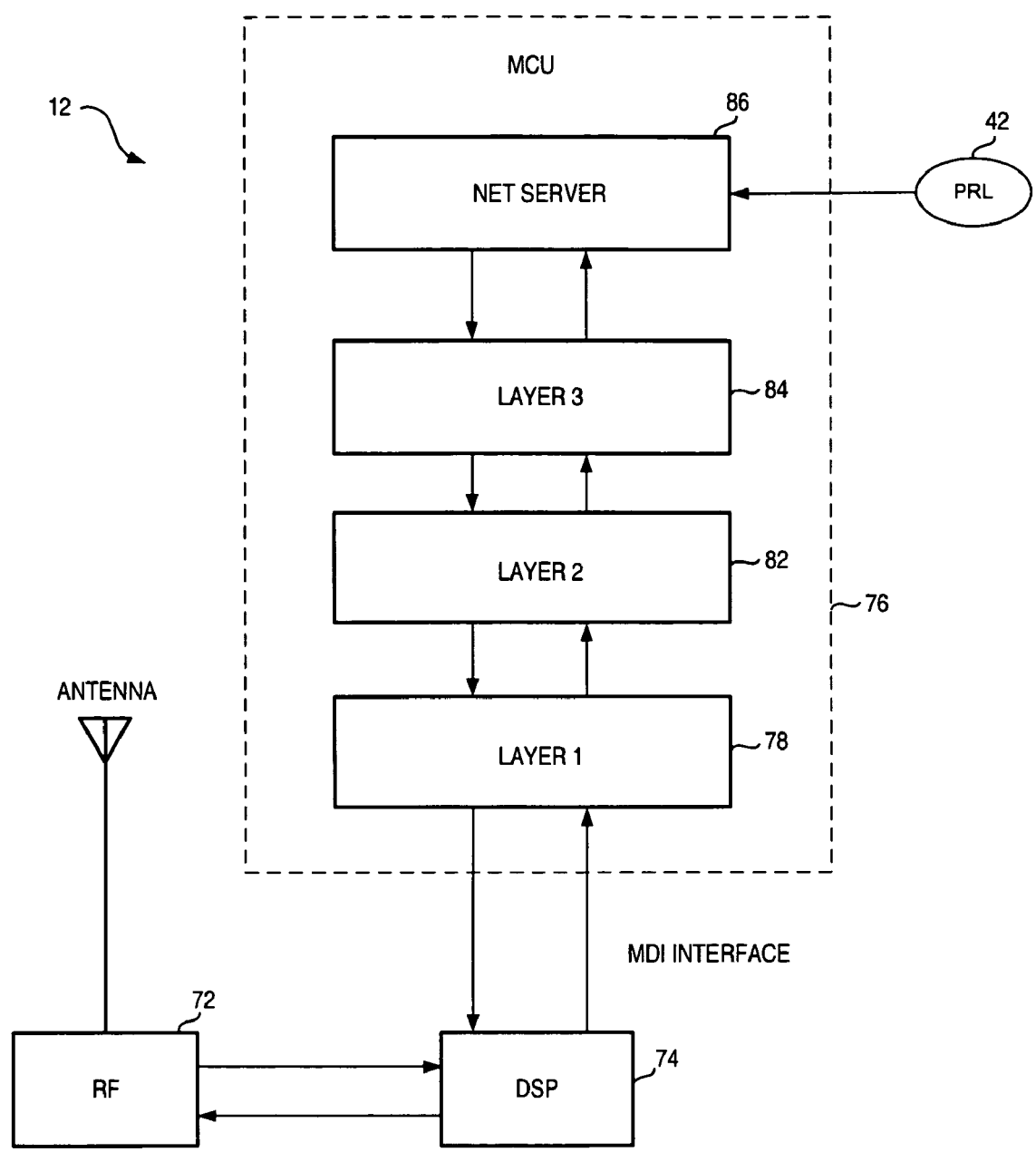
FIG. 2 illustrates a functional representation of a mobile station that forms a portion of the radio communication system shown in FIG. 1.

FIG. 2 illustrates the mobile node 12 that forms a portion of the radio communication system shown in FIG. 1. The mobile station is here represented in terms of a radio frequency (RF) portion 72 and a baseband portion formed of a digital signal processor (DSP) 74. An MDI interface connects the DSP to an MCU 76, here represented in terms of logical layers, including a first layer 78, second layer 82, third layer 84, and a net server layer 86. The preferred roaming list 42 is maintained at the net server layer 86. The list, forming a file, is provided, e.g., by the network operator of the home network of the mobile node. The net server layer uses the preferred roaming list file as an input and also follows the rules and requirements specified by the network operators for the system selection process. For each channel of the scan list, the net server needs to tell the lower logical layers to what channel to tune to search for a signal broadcast thereon. The commands are routed through the logical layers and the DSP programs the RF portion of the mobile node to the specified channel to search for the signal broadcast thereon and reports the results back to the net server layer. Thereby, the net server is made cognizant of the signal status of each channel that is searched for the generation of the broadcast signals thereon.

Figure 3:
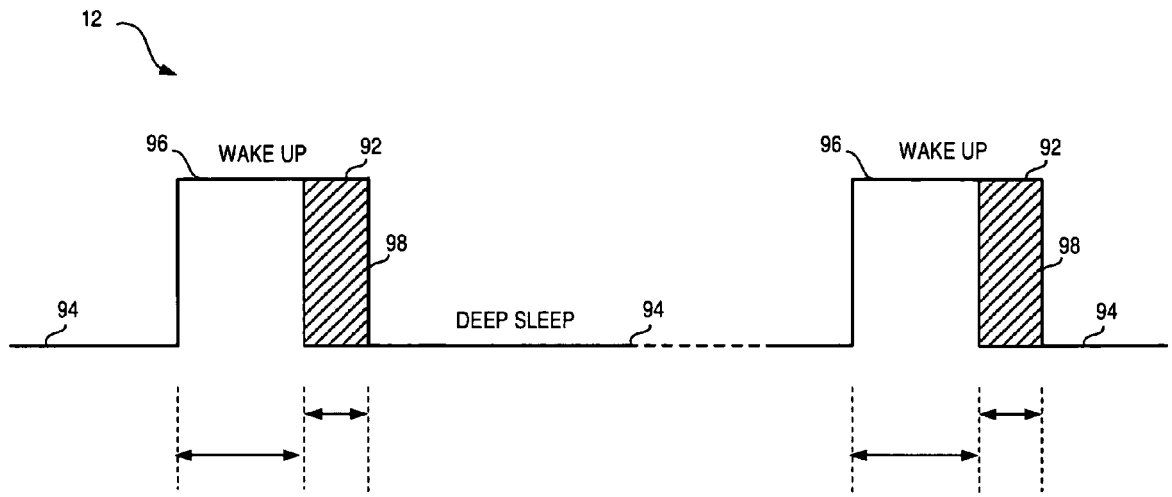
FIG. 3 illustrates a graphical representation of slotted mode operation of a mobile node that forms a portion of the radio communication system shown in FIG. 1.

FIG. 3 illustrates a graphical representation of the powered intervals of the mobile node, plotted as a function of time, when the mobile node is operated in a slotted mode. The mobile node is operated in a slotted mode to conserve battery power by operating the mobile node only intermittently, i.e., during the wake-up portions 92 and then minimizing power consumption during the deep sleep portions 94. The slotted intervals during which the mobile node is operated during the wake-up mode 92 includes the conventional period, i.e., the normal slot portion 96, during which the mobile node is conventionally powered to monitor for the broadcast of page messages thereto. Additionally, pursuant to an embodiment of the present invention, an additional powered portion 98 forms part of the wake-up portion. During this additional portion 98, the signal detector (shown in FIG. 1) 38 of the mobile phone operates to detect broadcast of signals by different ones of the network portions contained in the formal scan list and responsive to which the modified scan list is created.

The occurrence of the powered intervals and unpowered intervals is determined by a slot cycle index (SCI). The slot cycle index is defined in the cdma2000 operating specification and defines a slot that is of a length of 80 ms. The slot, i.e., start of the powered intervals, occurs at 1.28, 2.56, 5.12, etc. seconds depending upon the slot cycle index that is supported by the network portion and the mobile node. Through operation of an embodiment of the present invention, subsequent to the conventional, normal slot period, the mobile node remains powered and the channels of the formal scan list are monitored during the additional powered period.

Figure 4:
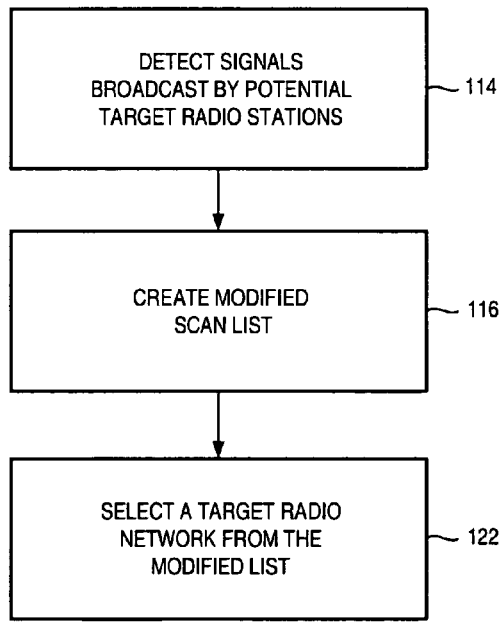
FIG. 4 illustrates a method flow diagram listing the method steps of the method of operation of an embodiment of the present invention.

FIG. 4 illustrates a method flow diagram that lists the method steps of the method of operation of an embodiment of the present invention. First, and as indicated by the block 114, signals communicated by the potential target radio networks are detected. Then, and as indicated by the block 116, a modified scan list is created. The modified scan list identifies the potential target radio networks associated with the signals detected during the operation of detecting. The potential target radio networks are identified in the modified scan list as a subset of the first set of potential target radio networks.

Then, and as indicated by the block 122, the selected target radio network is selected from the modified scan list.

Thereby, pursuant to operation of an embodiment of the present invention, a mobile node is operated during an extended portion of a powered portion of a power period when the mobile node is operated in the slotted mode. During the additional powered period, the mobile node detects whether broadcasts of signals by networks listed on a formal scan list are delivered to the mobile node. A modified scan list is created that identifies the network whose signals are detected during the additional powered period. Subsequently, when selection is to be made of a network with which the mobile node shall subsequently communicate, such as pursuant to a better system rescan procedure or a DPCH lost signal occurrence, a reduced list of potential target radio networks are used from which to select a selected target radio network. Because the information used to create the modified scan list is obtained prior to the need to select the target network, the information forms a priori information that permits selection of the target radio network in a reduced amount of time.

The previous descriptions are of preferred examples for implementing the invention, and the scope of the invention should not necessarily be limited by this description. The scope of the present invention is defined by the following claims.

What is claimed is:

1. Apparatus for a radio communication system having a mobile node selectably operable to communicate by way of an active radio network and subsequently selectably operable to communicate by way of a selected target radio network, the selected target radio network identified in a formal scan list that lists a first set of potential target radio networks, said apparatus for facilitating selection of the selected target radio network, said apparatus comprising:
a signal detector adapted to receive indications of the potential target radio networks listed in the formal scan list, said signal detector for detecting, during selected time intervals, signals communicated by the potential target radio networks;
a modified scan list creator adapted to receive indications of the potential target radio networks which have signals detected by said signal detector, said modified scan list creator configured to create a modified scan list that identifies the potential target radio networks associated with the signals detected by said signal detector, the potential target radio networks identified in the modified scan list are a subset of the first set of potential target radio networks;
a selector adapted to receive indications of the potential target radio networks for the modified scan list, said selector for selecting the selected target radio network therefrom according to a selection schemes;
wherein the mobile node is selectably operated in a slotted mode in which the mobile node operates in a reduced power state during first selected time periods and in an increased power state, relative to the reduced power state, during second selected time periods, and wherein the selected time intervals during which said signal detector detects the signals communicated by the potential target radio networks comprise portions of the second selected time periods.

2. The apparatus of claim 1 wherein page messages are selectably broadcast to the mobile node during selected paging periods, wherein the mobile node is operated in the increased power state during the second selected time periods to detect broadcast of the page messages to the mobile node, the second selected time periods of time lengths greater than the paging periods and the selected time intervals during which said detector detects the signals communicated by the potential target radio networks corresponding to time lengths of the second selected time periods less time lengths of the paging periods.

3. The apparatus of claim 2, wherein the mobile node is at least selectably operable pursuant to a code division multiple access communication scheme that defines a slot cycle index determinative of when the page messages, that are broadcast to the mobile node, the slotted mode in which the mobile node is selectably operable of reduced and increased power states corresponding to the slot cycle index, the selected time intervals during which said detector detects the signals communicated by the potential target radio networks.

4. The apparatus of claim 1 wherein the mobile node maintains a preferred roaming list, contents of the preferred roaming list defining the formal scan list, and the modified scan list created by said modified scan list creator formed of a subset of the preferred roaming list.

5. The apparatus of claim 4 wherein the preferred roaming list identifies radio networks in terms of relative preference, wherein the active radio network is identified on the preferred roaming list as less than most-preferred radio network, the selected target radio network selected by said selector identified on the preferred roaming list to be more-preferred relative to the active radio network.

6. The apparatus of claim 1 wherein the mobile node is selectably operable pursuant to a better system rescan procedure, the selected target radio network selected by said selector selected pursuant to the better system rescan procedure.

7. The apparatus of claim 6 wherein the better system rescan procedure is performed at rescan intervals and wherein detection of signals by said signal detector and creation of the modified scan list by said modified scan list creator are made within a rescan interval.

8. The apparatus of claim 1 wherein communications between the mobile node and the active radio network are susceptible to failure and wherein selection made by said selector is responsive to failure of the communications between the mobile node and the active radio network.

9. The apparatus of claim 8 wherein the mobile node is at least provided with indications of when the communications between the mobile node and the active radio network are susceptible to failure beyond a selected threshold and wherein detection of signals by said signal detector and creation of the modified scan list by said modifier are made when the indications indicate susceptibility of the communications between the mobile node and the active radio network to be beyond the selected threshold.

10. The apparatus of claim 9 wherein the detection of the signals by said signal detector and creation of the modified scan list by said modifier are made responsive to failure of the communications between the mobile node and the active radio network.

11. The apparatus of claim 10 wherein said signal detector monitors channels associated with the potential target radio networks in a selected monitoring order of successive ones of the channels, wherein the modified scan list created by said modified scan list creator including identities of potential target radio networks which have signals detected by said signal detector prior to selection by said selector.

12. The apparatus of claim 1 wherein said signal detector further detects whether signals communicated by the potential target radio networks and detected thereat exhibit at least first selected characteristics.

13. The apparatus of claim 12 wherein the modified scan list lists the potential target radio networks which have signals exhibiting the at least the first selected characteristics.

14. The apparatus of claim 13 wherein the at least the first selected characteristics comprises the first selected characteristics and at least second selected characteristics, the modified scan list listing the potential target radio networks which have signals exhibiting the first selected characteristics and the potential target radio networks which have signals exhibiting the second selected characteristics.

15. The apparatus of claim 14, wherein the modified scan list further indicates, together with identities of the potential target radio networks, which of the first and the at least second selected characteristics exhibited by the potential target radio networks.

16. The apparatus of claim 1, wherein the selected time intervals during which said signal detector detects the signals communicated by the potential target radio networks comprise a first portion of the second selected time periods and wherein the mobile node receives a page message during a second portion of the second selected time periods, the first portion comprises a smaller time period than the second portion.

17. The apparatus of claim 1, wherein the reduced power state comprises a powered state in which the mobile node monitors for the broadcast of one or more page messages.

18. A method for facilitating selection at a mobile node of a selected target radio network with which to communicate, the mobile node selectably operable to communicate by way of an active radio network and subsequently operable to communicate by way of the selected target radio network, the selected target radio network identified in a formal scan list that lists a first set of potential target radio networks, said method comprising the operations of;

detecting, during selected time intervals, signals communicated by the potential target radio networks;

creating a modified scan list that identifies the potential target radio networks associated with the signals detected during said operation of detecting, wherein the potential target radio networks identified in the modified scan list are a subset of the first set of potential target radio networks; and selecting the selected target radio network from the modified scan list created during said operation of selecting;

wherein the mobile node is selectably operated in a slotted mode in which the mobile node operates in a reduced power state during first selected time periods and in an increased power state, relative to the reduced power state, during second selected time periods, and wherein the selected time intervals during which said operation of detecting is performed comprise portions of the second selected time periods.

19. The method of claim 18 wherein the mobile node maintains a preferred roaming list, contents of the preferred roaming list defining the formal scan list and wherein the modified scan list created during said operation of creating is formed of a subset of the preferred roaming list.

20. The method of claim 18 wherein the mobile node is selectably operable pursuant to a better system rescan procedure, the selected target radio network selected during said operation of selecting selected pursuant to the better system rescan procedure.

21. The method of claim 20 communications between the mobile node and the active radio network are susceptible to failure and wherein selection made during said operation of selecting is made responsive to failure of the communications between the mobile node and the active radio network.

22. The method according to claim 18, wherein the selected time intervals during which said operation of detecting is performed comprise a first portion of the second selected time periods and wherein the mobile node receives a page message during a second portion of the second selected time periods, the first portion comprises a smaller time period than the second portion.

23. The method of claim 18, wherein the reduced power state comprises a powered state in which the mobile node monitors for the broadcast of one or more page messages.

* * * * *